United States Patent [19]
Campbell

[11] Patent Number: 5,641,819
[45] Date of Patent: Jun. 24, 1997

[54] METHOD AND NOVEL COMPOSITION BOARD PRODUCTS

[76] Inventor: Craig C. Campbell, 211 Isabella Ave., Washington, N.C. 27709

[21] Appl. No.: 214,557

[22] Filed: Mar. 18, 1994

Related U.S. Application Data

[63] Continuation of Ser. No. 846,922, Mar. 6, 1992.
[51] Int. Cl.$^6$ ................. C08L 1/02; C08L 97/02
[52] U.S. Cl. ................. 524/14; 524/839; 524/841; 524/843; 524/844; 156/330.9; 156/331.4; 156/331.7; 156/335
[58] Field of Search ................. 524/14, 839, 841, 524/843, 844; 156/330.9, 331.4, 331.7, 335

[56] References Cited

U.S. PATENT DOCUMENTS

| | | | |
|---|---|---|---|
| 3,930,089 | 12/1975 | Vasishth | 428/212 |
| 4,143,975 | 3/1979 | Lödige et al. | 366/147 |
| 4,209,433 | 6/1980 | Hse | 260/29.3 |
| 4,364,984 | 12/1982 | Wentworth | 428/106 |
| 4,388,138 | 6/1983 | Brown et al. | 156/289 |
| 4,396,673 | 8/1983 | Ball et al. | 428/326 |
| 4,514,532 | 4/1985 | Hsu et al. | 524/14 |
| 4,559,097 | 12/1985 | Janiga | 156/335 |
| 4,883,546 | 11/1989 | Kunnemeyer | 156/62.2 |
| 4,944,823 | 7/1990 | Stofko | 156/283 |

OTHER PUBLICATIONS

Bison System Bison—OSB—Plants of Bahre and Greton at least as early a Mar., 1991.

*Primary Examiner*—Paul R. Michl
*Assistant Examiner*—John J. Guarriello
*Attorney, Agent, or Firm*—Breneman & Georges

[57] ABSTRACT

A process for the preparation of composition board, particleboard, fiberboard, waferboard and oriented strandboard as well as new and useful products thereof are provided for by the separation of one portion of the solid constituents of the composition board and the separate blending of that portion with adhesive before combining and mixing that portion with the remaining solid constituents of the composition board product. The method and product is particularly adapted to the use of fines as the one portion of the solid component of composition board and utilizing the precoated fines as an adhesive carrier in the final step of mixing or blending of the fines with the remaining composition board components. The novel process and resulting products contemplate the separation of the solid components of the composition board products by particle size so that particles of 10 to 20 mesh, 20 to 40 mesh and 40 mesh and smaller are first separated from the remaining components and then the smallest component is judiciously coated with an adhesive to function as an adhesive carrier when mixed with the remaining solid components of composition board. The novel products of the invention include fines as adhesive nuclei for binding the larger components of the composition board together and produce a more uniform, cohesive and novel composition board product.

64 Claims, 11 Drawing Sheets
(6 of 14 Drawing(s) in Color)

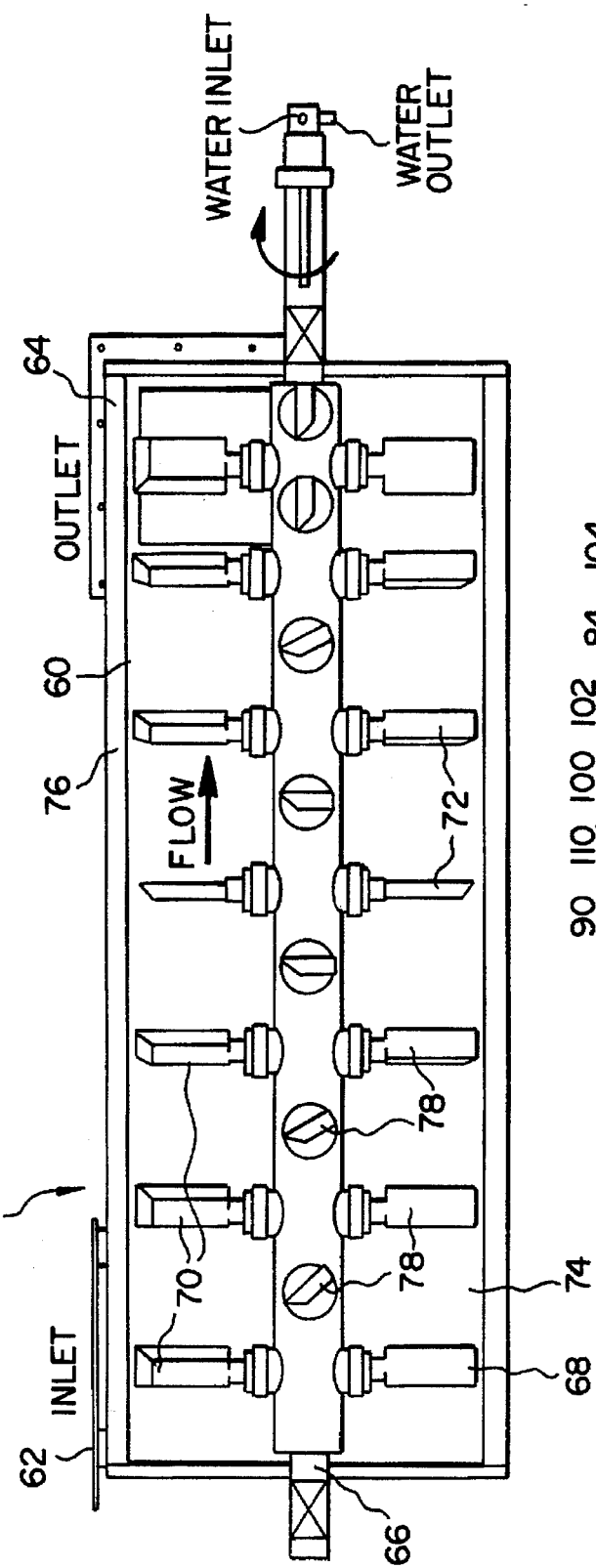
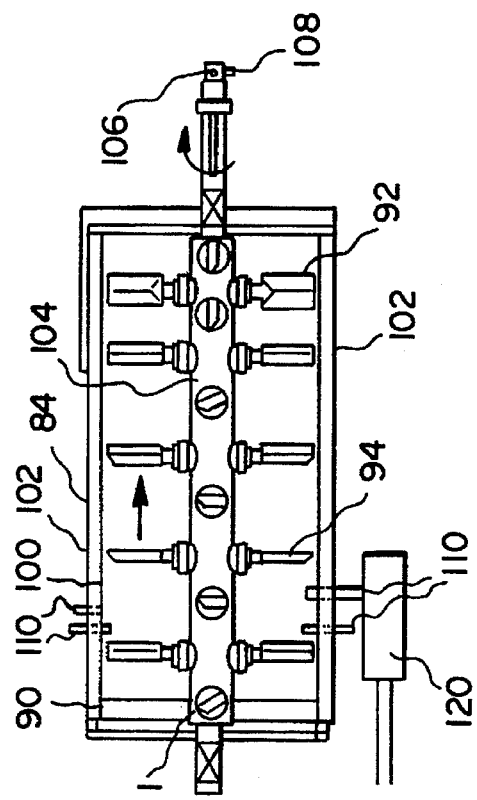

METHOD AND NOVEL COMPOSITION BOARD PRODUCTS

This application is a continuation of application Ser. No. 07/846,922 filed, Mar. 6, 1992, (status, pending, etc.).

BACKGROUND OF THE INVENTION

1. Field of the Invention

The invention pertains to a method for forming a variety of blended composition board products including particleboard, fiberboard, waferboard, oriented strandboard and layer particleboard and the novel board products resulting therefrom as the result of separation of one portion of the solid components of the composition board ingredients and the separate coating of that portion of the composition board component with an adhesive to employ that portion as an adhesive carrier and then combining that coated component with the remaining solid composition board components. Typically the coating of the first portion of the solid component of the composition board represents the smaller portion in volume and particle size and in the preferred applications represents the utilization of fines as an adhesive carrier for blended composition board products by the separating and coating the fines with resins, glues and/or waxes prior to mixing the coated fines with the remaining larger particles of the blended composition board to provide novel products having a more homogeneous consistency and better cohesive bonded properties than prior art composition board products without the adhesive carrying fines.

More particularly the invention pertains to a process and resulting novel products that include precoated fines of a particle size of about 10 to 40 mesh and smaller which operate as an adhesive carrier for novel composition board products that eliminate resin spots and nonuniform gluing of particles in the blended composition board. The present process and resulting products provide a more uniform distribution of adhesives or binders in the novel homogeneous composition board products by employing the coated fines as a nucleus for attaching to larger particles to provide a more uniform and homogeneous product having superior cohesive and bonding characteristics for the same or less resin content than the prior art.

2. Description of the Prior Art

The prior art blending tools, blenders and processes have been directed toward providing a more homogeneous and better blended composition board product. Various types of blenders and related processes have been employed to achieve a more homogeneous and better bonded product. These methods and apparatus have usually been in the direction of modifying blending apparatus to become larger, longer and more sophisticated as a means for providing a more homogeneous and better cohesively bonded product.

One such prior art apparatus for applying adhesive to fibrous material includes Lodige, et al, U.S. Pat. No. 4,143,975 which provides an apparatus for more efficiently adding resin and gluing the components together by the utilization of larger and more complicated blenders. Such prior art blenders have defined gluing zones and mixing zones with each zone having different types of tools to provide different processing zones in the blender designed to treat all the wood and attempt to place all the resin or glue on all the wood. Such long, large diameter blenders provide specialized functions for the mixing and attempt to provide a more uniform application of glue to the mixed components to provide composition boards of a more homogeneous and uniform composition.

The Lodige, et al, U.S. Pat. No. 4,143,975 like the other prior art mixing and blending apparatus and methods are based upon the prior separation and discarding the fines from the components of the composition board since fines have heretofore generally been considered as undesirable components of composition board products. Fines are generally believed to rob the resin from the larger components of the blended mass and result in resin soaked fines aggregates and poorly bonded products. Once the fines have been removed the object of such prior art blenders and processes is then to get all the glue on all the wood in a single blender for blending all the solid constituents in an aggregate mass.

The present method unlike the Lodige, et al, U.S. Pat. No. 4,143,975 prior art does not mix the entire mass of composition board components together and apply glue or resins and waxes to the composition in separate mixing zones and gluing zones within a single composition board blender. In contrast to such prior art the invention separates the smaller particles or fines from the larger particles and then separately coats the smaller particles in a separate blender to provide a separate blended composition of precoated smaller particles which act as a resin carrier for the remaining components of the composition board. The precoated smaller particles or fines are then united and mixed in a second blender or mixer to provide a composition board having a more homogeneous and cohesive aggregate than heretofore available in the prior art.

The combination of the previously coated smaller particles or fines with the larger and preferably uncoated components of the composition board products of the invention provides a more uniform and cohesive final product than the prior art. The invention also unlike the prior art contemplates the use of fines, that are typically of a particle size of about 10 to 40 mesh or smaller. In the preferred application fines of a particle size of 20 to 40 mesh and 40 mesh and below that were typically discarded in the prior art processes are now utilized as a coated resin carrier to then be mixed with the remaining and typically uncoated larger solid components of the composition board product.

The prior art has generally in the preparation of composition board products also sought to apply all the resin or glue on all the components in a single mass resulting in blenders of greater length and diameter. Some of these methods have relied upon complicated systems for spraying and atomizing resins and increasing the viscosity of the resin along with the utilization of complicated tools for the application of glues and resins to the particles. These prior art methods of mixing in a single mass after the removal of fines has sought a more homogeneous mixture of components to eliminate resin spots and the poor cohesive nature of composition board in which all the glue has not been put on all of the wood components.

To further these objectives of the prior art it was also believed necessary to screen out or remove the fines and discard the fines as waste products since the fines rob the glue or resins from the larger particles thereby resulting in composition board of inferior qualities and significantly increasing resin consumption which typically represents the most expensive component of composition board. The invention in contrast to such prior art utilizes, instead of discards the fines as a resin carrier by precoating the fines in a separate high intensity blender and then combining the resin coated fines with the remaining components of the composition board in a conventional blender or an optimized mixer.

Prior art such as Vasshth, U.S. Pat. No. 3,930,089 forms a resin mass from rice hulls which is then placed in a hot press and subjected to heat and pressure to provide a layered board. This prior art while utilizing a previous waste product does not employ the process of the invention or the novel products of the invention by separating fines and utilizing the fines as a resin carrier for subsequent mixing in a blender with the larger particles of the composition board to provide a blended as opposed to a layered or laminated product of such prior art. The invention also in contrast to the prior art utilizes the fines of the composition board products and does not employ rice hulls from which the fines have been removed. The invention provides blended uniform homogeneous Composition board products having fines evenly distributed throughout the product to provide a more homogeneous and superior cohesive product than heretofore available in the prior art.

The prior art of blended composition board products including particleboard, medium density fiberboard, waferboard, oriented strandboard and number 3 layered particleboard have heretofore all utilized traditional manufacturing process in which the fines have first been removed and discarded before blending the composition board products. The fines have been removed in the belief fines rob the resin when blended together with the larger components of the blended composition board product and result in resin balls and clumps and a nonhomogeneous product. In spite of the removal of fines, resin spots and poor distribution of resin has remained a problem. In response the prior art has sought blending machines of more sophisticated and complicated design that are generally of larger size to solve the problem of providing a more uniform composition having better cohesive qualities.

Typically such prior art blender machines have increased in size to 3 feet or more in diameter and to more than 14 feet long and have increased in internal complexity in having a plurality of mixing, resin addition and blending zones and tools of varying design in each of the zones. It will also be recognized by those skilled in the art that the number, type and complexity of design of the tools also increase as the diameter of the machine increases since a smaller and more compact machine having a smaller diameter can provide greater mixing capabilities by operating at a higher RPM. Similarly the approach of the prior art of getting all the resin on all the wood in a single blended mass has increased the number of stations located in the prior art blenders as well as the complexity of those stations in spraying or otherwise adding resin in the blender. The effort to increase blending efficiency has also resulted in reducing the viscosity of the resin in an effort to provide a more uniform distribution in the prior art blending processes.

The invention unlike the prior art does not seek to utilize larger diameter and longer machines to increase the efficiency of the blended components of the composition board product but instead employs a novel method of not blending all the components in a single mass and in utilizing instead of discarding the fines of composition board products as a resin carrier and in increasing rather than decreasing resin viscosity. The method of the invention first separates the components of composition board into two groups. The first group is then judiciously coated with an adhesive or resin which may or may not be mixed with waxes. The first coated group operates as a resin carrier to reduce, if not entirely eliminate resin spots in the final product. The first group is then mixed or blended with the second group of components which typically is not coated with an adhesive. In the preferred application of the invention the first group represents the smallest component in terms of particle size and volume and preferably are fines that typically had previously been discarded in the prior art. The fines are then blended with resin in a high intensity blender and then subsequently blended in a second blender to blend the resin coated fines with the larger particles of the composition board product.

The second blending step is preferably without the addition of more resin since the resin coated fines when mixed in proper proportions with resin operate as the binding nuclei for the remaining solid components to reduce total resin used, remove the formation of resin spots and provide a new and more homogeneous composition board products. The advantages of the present process provide further advantages in not only reduced cost, shape and size of the equipment but also results in novel products as will be discussed hereinafter in greater detail.

SUMMARY OF THE INVENTION

In accordance with one aspect of the invention novel composition board products are fabricated by separating the solid components into two groups of solid components and then blending the first group with an adhesive in a blender so that the first group acts as an adhesive carrier. The adhesive carrier first group is then again blended in a second blender with the first group of solid components. The first group typically represents ⅓ or less of the entire mass and preferably represents ⅕ or less of the sum of the two groups. The first group also preferably represents the smallest of the particle sizes of the two groups and preferably are fines in order to more efficiently operate as an adhesive carrier for when the two groups are combined together in a second blender. The two blenders in accordance with the invention operate in series as opposed to a parallel arrangement typically employed in the prior art.

The invention contemplates the control of the important steps in the production of composition board to provide a novel composition product. The solid components are first divided into two groups and the blending of the first group is controlled by using a high intensity blender for the adhesive carrying component. The density of the adhesive is controlled as well as the size and quantity of particles in the first group receiving the adhesive in order to provide a first blended mix which operates as an adhesive carrier. In a further application of the invention the temperature of the first group of particles is also controlled in the first blender to partially cure the adhesive carrier before the adhesive carrying particles are combined in the second blender with the second group of particles.

In accordance with another aspect of the invention the novel process and resulting product is provided in which the fines, alone or in combination with larger particles are separately treated in a first high intensity blender by the application of resin, glues and/or waxes generally employed to bind composition board products together to allow the fines and smaller particles to act as an efficient carrier and distributor of resins, waxes and glues in the second step of combining the product of the first blender with the remaining solid components of the composition board product in a second blender or mixer. The precoated fines and smaller particles of the composition board are then combined and mixed in the second blender or mixer with or without, and preferably without additional resins, glues, waxes and other optional binding compositions being added in the second blender as a second step of the process of the invention to more evenly distribute the resin and binding compositions to the larger particles.

The precoated fines and smaller components for the purposes of the invention are fines that are capable of passing through 10 to 40 mesh screens but which also depending upon the desired components of the composition board product can be up to 10 mesh where the largest particles are about ⅛ of an inch or slightly larger. The fines for purpose of the invention represent the smallest component of the blended composition board product in particle size and by weight that are pre-coated with adhesive or other binder before being blended with the larger particle sized solid components of the composition board in order to efficiently carry and distribute the adhesive and optional waxes to the larger particles. The utilization of the fines as a resin carrier to distribute the adhesive can be used as a method of reducing the quantity of adhesive or binder utilized in the composition board product to obtain a given strength or composition board property. The precoated fines also assist in the homogeneous distribution of adhesive or binders to provide a composition board product having a more homogeneous character by the drastic reduction in the size and distribution of resin filled interstices in the composition board product.

The invention is the result of years of experience and an extensive investigation into the blending of blended composition board products and the fabrication of improved particleboard having a reduced total resin requirement for given properties and in providing novel products having a more even distribution of adhesive to particle to provide a more homogeneous composition board product. The method of the invention includes the judicious application of resin to the fines and smaller particles of the composition board product by the utilization of the high energy input blender which more efficiently provides blending of the resin and the fines and smaller particles before the coated resin carrying fines and smaller particles are blended in a second step with the remaining components of the composition board product. The preferred high energy input blender is typically 8 inches in diameter and 40 inches in length and operates at from about 1,000 to 3,500 RPM as opposed to the larger blenders traditionally employed which may be almost 3 feet in diameter and 12 feet in length and which typically operate at 1,000 RPM or less.

The method of the invention further contemplates the separation of fines by various physical means such as screening, sieving, air cyclone, air flotation means or by selective air separation utilizing various types of air handling or mechanical separation equipment. In accordance with the method of the invention, the fines are not discarded but instead are precoated in a first high energy blender of a relatively small diameter of about 8 inches which is capable of operating at from about 1,000 RPM to 3,500 RPM to blend the resin, glue or other such binder or adhesive with the fines such that 75% to 100% of the binder or adhesive is added to the high energy blender.

Unlike the prior art the entire mass is not blended in a single blender in a single mass in an effort to get all the adhesive on all the wood. The invention instead uses two blenders arranged in a series in which most if not all the adhesive is placed on one portion of the wood which represents ⅓ or less of the solid wood component and preferably represents the smallest particles of the composition board product. Thereafter the second portion of solid ingredients of the composition board product are mixed or blended with the resin carrying first portion to provide novel composition board products having a more homogeneous composition board product exhibiting a more uniform and smaller resin boundary around particles and a product with a more finished feeling and appearing surface and cross section than composition board products of the prior art.

In the best mode for practicing the invention the solid components of composition board are first separated into three rather than just two categories based on particle size. The largest particles for example ⅛ of an inch and larger are not coated with resin. The intermediate particles of for example 10 mesh to 20 mesh are separated and coated with resin as are the smallest particles of 20 mesh to 40 mesh and smaller. A third blender is used to coat intermediate particles of 10 mesh to 20 mesh. The third blender is preferably a separate high energy blender operating at between 1,000 to 2,000 RPM and preferably 1,500 RPM at which time about 3% of the resin or glue is added based on the total weight of the finished composition board product. The fines which in this case representing all particles below 20 mesh are blended in a separate first high energy blender operating between 2,000 to 3,500 RPM and preferably at 2,500 RPM at which time about 4% of the resin or glue is added based on the total weight of the finished composition board product.

The products of the first and third high energy blenders are then combined with the remaining solid components of the composition board in the second blender which may be a conventional blender or mixer without the addition of further glues or resins as long as the total resin requirements of the composition board product had been previously added in the high energy blenders. Generally the total resin used is 7% which is used in the prior art but which quantity of resin provides a superior finished product.

Alternatively smaller amounts of resin can be used to duplicate the properties of prior art composition board products. In the application of the invention the utilization and separate treatment of the fines, intermediate components and largest components provides for the more efficient and judicious application of resins, glues and other adhesives to the particles of the composition board to provide a more uniform and homogeneous distribution of particles in the composition board product. The separation of the components and individual treatment of the various components of the composition board product before final mixing of the components of the composition board can be used to either reduce the total resin requirements or to construct novel composition board products with superior properties.

Composition board products produced in accordance with the preferred embodiment of the invention are distinguishable from the prior art in that they include a greater percentage of fines and typically have all of the fines and smaller particles substantially coated with resin which particles are then bound to the larger particles that are less completely coated with resin. The prior art composition board products in contrast have an absence very small percentage of fines with all the resin or glue distributed in between the larger pieces.

Magnified and microscopic examination of cross sections of blended product of the invention and the prior art show differences in resin distribution in particle interstices. In the prior art resin accumulation is readily apparent in the interstices whereas in products manufactured in accordance with the invention resin distribution appears to have virtually disappeared in the interstices as well as the general disappearance of the interstices themselves. Composition board and composition board products as used herein are used in their broadest sense to describe particleboard, medium density fiberboard, waferboard, oriented strandboard, No. 3 layered particleboard and as well as other composite boards or materials formed from the addition of glues and binder to form an uncured resinous cellulose mass which is subsequently formed and cured into products. The novel products of the invention include a higher percentage of fines to larger particles in the final composition board product. Typically the percentage of fines or smaller particles in prior art particleboard of 10 mesh to 20 mesh is about 20% and from 20 mesh to 40 mesh is 30% and from 40 mesh and below is 10%. In contrast the novel composition board products of the invention have a percentage of fines or particles of 10 mesh to 20 mesh is 30% and from 20 mesh to 40 mesh is 25%and from 40 mesh and below is about 40%.

Compositions of the invention do not have to have each category of fines in order to be considered a product made in accordance with the invention. Novel products of the invention may be made by selecting one or more of the smaller particle sizes and coating them for the purpose of acting as a resin carrier for the larger particles. As a result novel compositions may be created by selecting one or more types of fines solid particles from the group consisting of 10 mesh to 20 mesh, 20 mesh to 40 mesh and particles of 40 mesh and below operate as resin carriers for a second group of particles that have a relatively larger particle size.

The invention is applicable to the utilization of various types of resins including liquid and powdered resins and liquid and powdered additives used for particleboard and medium density fiberboard as well as formaldehyde, urea resins, melamine resins, preferably isocyanate phenol resins and combinations thereof, all of which resins, glues or binders are collectively referred to as adhesives. The method of the invention is equally applicable to thermosetting resins as well as polymerizable resins utilized in the formation of composition board products.

The adhesives along with other additives such as waxes, scavengers and other materials can be separately introduced and controlled in any of the steps of the process of the invention in preblending or in the addition at various stages in the series of blenders. In addition, waxes preferably without additional adhesives and other materials can be selectively added to the final composition board mixer or blender at the final combination of precoated fines with larger products to form composition board products of the invention which exhibit a uniform and homogeneous character.

The invention is applicable to all forms of composition board including particleboard and medium density fiberboard as well as application to various types of blending systems. In essence the present invention unlike the prior art divides up the solid ingredients into two groups and separately treats each group so as to not add all the resin to all the wood in a single blending step. In addition the invention utilizes instead of discards the fines and smaller particles. These fines and smaller particles are then separately treated and coated to employ the fines and smaller particles as efficient resin carriers before the final mixing of the coated fines and smaller particles to the remaining solid components of the composition board product.

In a further aspect of the invention the fines and smaller particles are toasted or heated to reduce the amount of absorption of resin into the smaller particles and operate to partially cure the resin. Unlike the prior art the resin is preferably added at a dense viscosity to the high intensity blender and is preferably chilled to about 40 degrees Fahrenheit as a further method for increasing the viscosity of the resin to between 600 to 900 centipoises. It has been found the method of the invention with or without the step of toasting surprisingly reduces rather than increases the total resin requirements for the composition board products while at the same time providing an efficient adhesive carrying system for the final mixing or blending of all of the products together in a novel composition board product.

DESCRIPTION OF THE DRAWINGS

The novel aspects of the present invention will further become apparent in view of the following drawings in which:

FIG. 1B is a prior art illustration of a pair of blenders in parallel arrangement employed in the prior art process for the preparation of composition board;

FIG. 4 is a cross sectional illustration of a high intensity blender for blending adhesive with fines in accordance with the invention;

DETAILED DESCRIPTION OF THE INVENTION

Figure 1A:
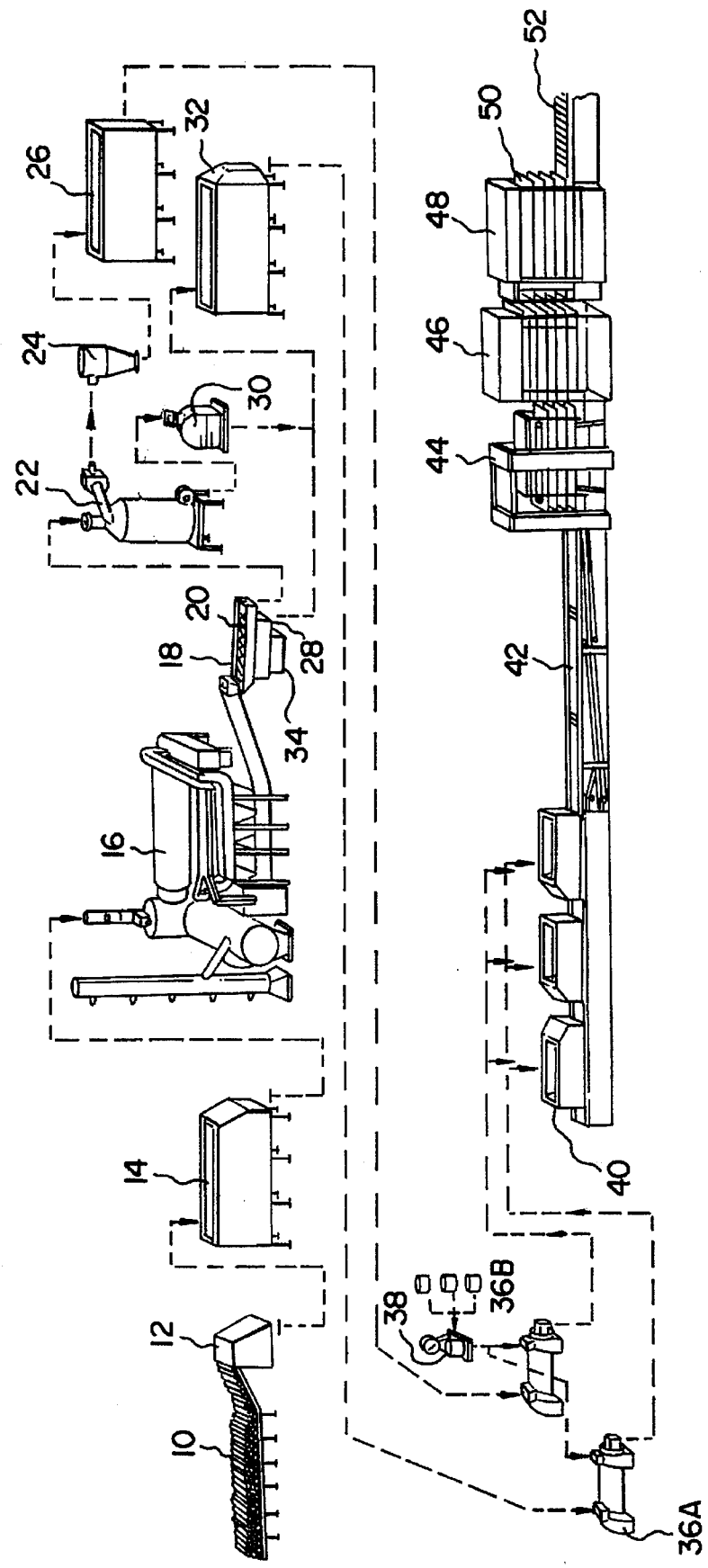
FIG. 1A is a prior art diagrammatic illustration of a process for forming composition board.

The process of the invention can be more readily distinguished from the prior art by reference to FIG. 1A which illustrates a prior art system for the production of blended composition board products in a continuous production line system. In addition to the mechanical prior art system illustrated in FIG. 1A additional types of blending systems include blowline and belt blending which are in use for the production of composition board products. In all of these prior art systems including the mechanical prior art system illustrated in FIG. 1A wood and wood byproducts are first particulized and then the fines are removed to prevent undue resin use before the larger particularized components are mechanically blended, blowline blended or belt blended.

In such known prior art systems the particulized solid wood components, absent the fines, are blended in a single continuous batch to get all the resin or adhesive on all the wood. In all such prior art processes the application and mixing of resin with the components has sought as uniform and thorough an application of resin as possible by various means such as for example the introduction of fine mists and atomized sprays of resin. In some cases of belt blending resin spray guns are mounted over a wide conveyor belt and resin is applied directly to the dry fiber as it passes under the resin spray gun. Once the mass is sprayed a high speed paddle blender is then utilized to assist in the distribution of the resin. In some of these processes fines are utilized but only for the purpose of surface treatment of the final blended composition product.

In all of the prior art processes the problems of the volume of resin use, resin drying and resin spotting are major problems to which much attention has been directed in order to prevent the buildup of resin, reduce the overall consumption of resin and reduce the nonuniform and nonhomogeneous mixture of composition board. Blowline blending uses higher resin of about 0.5% to 2% greater than mechanical blending and many times for that reason alone is not utilized. Belt blending similarly exhibits problems of resin drying and resin spots since the application of and mixing of the components does not provide for a uniform mixing of ingredients. Mechanical mixing systems similarly exhibit problems of resin buildup and resin balls which become objectionable resin spots or freckles on finished panel surfaces.

Resin spotting is also a problem in mechanical blending which seeks to solve the problem by utilizing larger and more cumbersome mechanical blenders (FIG. 1B) which are designed to promote resin efficiency. Many plants utilizing mechanical paddle blenders have added various types of tools and differentiated various zones within the prior art blenders along with various means such as the utilization of paddles that add resin through the paddles to the matrix to reduce resin spotting. Mechanical blending is often the choice since other prior art blending techniques may provide better products but at the expense of higher resin or binder consumption.

In all of the prior art methods, whether belt blending, blowline or mechanical blending systems, fines and small particles are first removed by screening, air separation or other prior art particle separation techniques to prevent the fines and small particles from soaking up the resin at the expense of the larger particles and to reduce the development of resin balls, resin spots or freckles in the finished product. Recently however in some processes fines have been used for purpose of decoration or providing a fine face layer for composition board. Fines however have not been used in the core material of the composition board or first coated with resin to serve as a resin carrier. In none of the prior art systems are the fines purposely removed for a separate blending pretreatment and thereafter used as resin carrier by mixing the blended pretreated fines with the remaining solid components of the composition board product in a blender to provide a homogeneous composition of fines and larger particles.

Referring now to FIG. 1A a typical prior art process for the continuous production of composition board is illustrated in which wood products 10 are flaked in a flaker 12 and then transferred and possibly stored in a bin 14. The flakes from bin 14 are thereafter dried in a drier 16 before the flaked wood products are screened or separated in a separator 18. In many prior art systems the drier 16 includes a special combustion chamber for burning the fines that are removed from separator 18 since in most prior art systems the fines are treated as waste product.

Separator 18 separates large flaked particles by screening and removing the large particles from a first screen 20. The larger particles mechanically removed go to an air classifier 22 which sends any oversized particles to a refiner 24 so that all the particles are of a fairly uniform size of about ⅛ inch to 10 mesh. The separated large particles are generally then placed in a bin 26. Meanwhile smaller particles removed by screen 28 are placed in bin 32 along with smaller particles removed by air classifier 22 and cut to a uniform size by flaker 30. The smaller particles placed in bin 32 represent the smallest desired components of prior art composition board processes which are in the range of 20 to 40 and sometimes to 50 mesh and which particles are all combined together in a single blender 36 in which all the adhesive or resin is placed on all the wood. The fines removed by screen 34 which are less than 40 or 50 mesh are then discarded, used as a fuel for a special combustion chamber for fines or in some cases the wood waste and/or dust is used for surface decoration on the finished composition board product.

The fines are not used in the prior art processes for the manufacture of composition board product core material since they are known to rob the resin when blended together in a single stage blending process. The fines are generally considered to be materials of less than 40 mesh particle size. Such fines are generally discarded and not utilized in the prior art in the preparation and production of composition board since the fines make it more difficult to get all the resin or binder on all the wood and significantly increase the amount of resin consumption.

As a result only the larger pieces of wood typically of a particle size of ⅛ of an inch to about 10 mesh are transferred from bin 26 and combined with the smaller particles having a particle size of 40 mesh or greater which are transferred from bin 32 to blenders 36A or 36B to which a metered mixing and feeding device 38 is connected.

It will be recognized that blenders 36A and 36B are arranged in parallel in the prior art. In other words all the solid constituents of particleboard must go either through blender 36A or blender 36B but not through both blender 36A and blender 36B. The purpose of utilizing two blenders 36A and 36B in parallel in the industry is so that when one of the blenders become clogged, plugged or resin buildup and spots start appearing in the blended product production continues by shifting from blender 36A to blender 36B or vice versa so that production of the blended composition to the forming station 40 is not stopped.

The prior art in addition utilizes large blenders to achieve an even distribution of binder on the composition board components. Large blenders such as 36A and 36B are considered necessary to achieve low resin consumption and to prevent the breaking of the wood components into smaller pieces during blending in order to get most if not all the resin on most if not all the wood in the single stage blending operation. Typically blenders 36A and 36B are 2 to 3 feet or more in diameter and 12 feet long or more. As a result typical prior art blenders operate at an RPM of about 500 to 800 RPM and are not high energy blenders capable of operating at high RPM which are for the purposes of the invention from about 1,000 to 3,500 RPM.

The blended composition of glue or resins from glue mixing and feeding device 38 and wood products from bins 26 and 28 is transported to forming station 40 to form the desired composition board product. The composition board product is then transported from the forming station 40 by belts 42 to loading cage 44. A press 46 and unloading cage 48 is provided before the final composition board panels 50 are transported from the plant by belt 52.

The prior art blending machine 36 is best illustrated in FIG. 1B in which a housing 60 includes a wood product inlet end 62 and a blended composition product outlet end 64. A rotatable shaft 66 is provided in housing 60 on which a plurality of paddles 70 are provided for mixing the composition board components. The first few paddles 68 may be of a specialized configuration for assisting in the input feed for the wood products from bins 26 and 32 of the composition board product. Paddles 78 may be of a specialized design since they are in the vicinity of the resin pots 74 through which resin is added and mixed to the wood components blended in housing 60.

A water jacket 76 is provided around housing 60 for cooling blender 36 which water cooling may also include means for cooling the shaft 60 and tools 68, 78 and 72. Paddles 70 can be of a variety of prior art configurations for mixing the resin, glue and other fluid materials added together with the wood components of the composition board. In most if not all prior art blenders these tools are about 6 inches to a foot and a half in length and are distributed about 4 to 6 inches apart along the length of blender 36. These prior art systems of increasing diameter and length have not solved the problem of providing a superior blended product and such single stage blending and the use of prior art parallel blenders are believed incapable of producing the novel products of the invention unless they are placed in series and the method of the invention is utilized as will be described hereinafter in greater detail.

Figure 2:
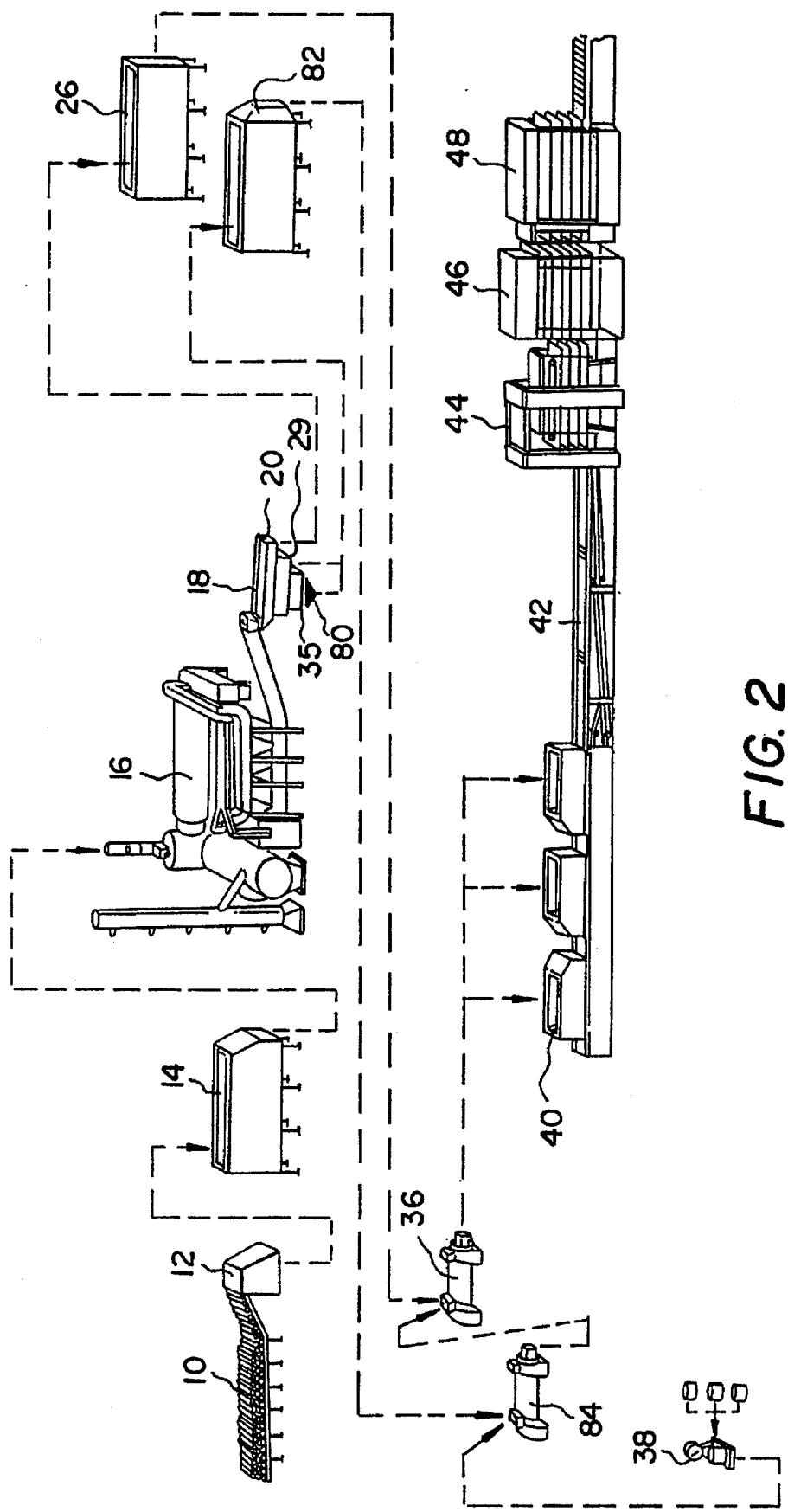
FIG. 2 is a diagrammatic illustration of a process for manufacturing composition board in accordance with the invention.

Referring now to FIG. 2 the differences between prior art methods and the method of the present invention becomes readily apparent since the blenders are placed in series rather than parallel. In other words a portion of the wood components must go through both blender 84 and blender 36 while another portion of the wood product goes only through blender 36. As indicated in FIG. 2 the wood products 10 go through flaker 12 and bin 14 and through a prior art single pass drier 16. The modification in accordance with the invention begins with separation of the wood components after passing through drier 16. The wood products from drier 16 are separated by use of screens, sieves, air classifiers, air separators or other mechanical processes to separate larger particles from the smaller particles and fines. Traditional screening apparatus 18 may be employed to separate the products but in accordance with the preferred embodiment of the invention an air classifier is preferably utilized for separating the fines and utilizing the fines as an efficient resin carrier.

As indicated in FIG. 2 the larger particles can be removed by screen 20 and further cut or refined as desired before placement in bin 26 for subsequent addition to a blender 36 which may be of a conventional design but which in the preferred embodiment of the invention is also modified as will be discussed hereinafter in greater detail. The invention however unlike the prior art utilizes the smaller particles of 10 to 20 mesh collected by screen 29 and/or fines of a particle size of from about 20 to 40 mesh or 50 mesh and below collected from screen 35 as a resin carrier by first collecting and separately coating the smaller particles and/or fines in a high intensity blender 84.

The fines collected by collector 80 may be transported to bin 82 along with the smaller particles of 10 to 25 mesh collected by screen 29. The fines and smaller particles collected and transported to bin 82 are preferably wood particles having a particle size of between 10 to 40 mesh and below.

The fines or smaller particles are then transported to a high intensity blender 84 which is of a small diameter, typically 8 inches in internal diameter and about 40 inches in length which can as a result of its compact size operate at a speed of 1,000 to 3,500 RPM to blend the fines with an adhesive which can contain wax and other optional materials from the glue mixing and feeding device 38. Resin is added to the high intensity blender 84 in a thick viscosity of 500 centipoises or greater and preferably between 600 to 900 centipoises. The control of the viscosity of the resin to introduce the resin at a thick viscosity contrasts to the prior art which does not separate fines and which adds resin at a thin viscosity and in some cases in a spray mist. Typically in accordance with the method of the invention about 75 to 100% of the resin utilized in the production of the composition board product is mixed with the fines or smaller particles in blender 84.

Adhesives in the form of resins or glues are the most expensive component of particleboard and the present invention in utilizing the fines as a resin carrier can be used to reduce the resin requirements by about 20% resulting in substantial savings in the preparation of composition board products. Alternatively the 7% amount of resin traditionally used in the manufacture of composition board can be maintained to produce novel products of increased strength.

The larger components from bin 26 are introduced into blender 36 from bin 26 by an auger or belt transport to be combined in blender 36 with the coated fines product of the high intensity blender 84. In the preferred application of the invention no additional resin is added to blender 36. All of the resin has been added to the judiciously coated fines which are utilized as a carrier to bond the larger untreated particles together to form an aggregate which reduces the total quantity of required resin while substantially increasing the uniformity and quality of the composition board produces. In the preferred application of the invention waxes and other nonbinder components can be added to seal the larger particles. Once the larger pieces are mixed in blender 34 with or without the addition of resins, waxes or other optional materials the product is transferred to a forming station 40 and then to the loading cage 44 by the conventional conveyor 42. Thereafter the novel product can be placed in the loading cage 44, press 46 and unloading cage 48.

It will be recognized in a comparison of FIG. 1A with FIG. 2 that FIG. 1A provides alternative blenders 36A and 36B that are arranged in parallel so that plugging of one blender does not shut down production. In contrast the invention utilizes two different types of blenders that are arranged in series rather than a parallel arrangement of the prior art. In the present invention both the high intensity blender 84 and a somewhat more conventional type blender 36 is arranged in series so that both blenders are required for production of the composition board product. It is possible to provide alternative lines of a high intensity blender 84 and conventional blender 36 to increase production but such an arrangement is generally not required for purposes of resin spots since the invention reduces the problems of resin spotting by utilizing a high intensity blender and fines as a resin carrier to virtually eliminate resin spotting. Resin spotting is not a problem in the present invention as long as large amounts of resin are not added to the second blender.

Referring now to FIG. 4 a high intensity blender 84 is illustrated for judiciously coating the fines and smaller particles. High intensity blender 84 includes an inlet 90 for the introduction of fines and smaller particles and an outlet 92 for discharging the judiciously coated fines which are then conveyed to the composition board blender 36. High intensity blender 84 is of a generally cylindrical cross section but is different from prior art blenders in that it has an internal diameter of about 8 inches and is about 40 inches long as opposed to prior art blenders which conventionally are 2 to 3 feet in diameter and 12 feet long.

The compact diameter of high intensity blender 84 allows the blender to be operated at a higher RPM than conventional blenders to provide greater blending intensity of resin with fines. Conventional blenders operate at speeds of lower than 1,000 RPM and do not blend fines but instead blend all of the composition board components in which most, if not all, the fines that have particle sizes of less than 40 mesh have been removed. High intensity blender 84 is designed to operate at RPMS over 1,000 and up to 3,500 RPM and is designed in the preferred embodiment to have 10 stations about 3.9 inches apart with each station having a V shaped or triangular shaped plow tool 94 to provide for the intense blending of fines and adhesive or other binders to serve as a resin carrier for the composition board blender 36.

High intensity blender 84 includes a housing 100 and preferably includes a water jacket or heating means 102 for heating or toasting fines introduced into the inlet 90 and for heating the resin and fines as they are mixed in the high intensity blender 84 to prevent undue resin absorption into the fines. Heating of the fines at or before their introduction into high intensity blender 84 alone or together with heating the mixture partially cure the resin to further reduce the amount of resin used.

In the preferred embodiment shaft 104 includes a means for heating the shaft 104 which also may be connected to a water jacket 110. Water jacket 106 on shaft 104 employs a water inlet 106 and a water outlet 108 which may also be utilized to heat tools 94 to provide a uniform internal temperature while blending. The present method also unlike the prior art adds resin at a high resin viscosity of about 600 to 900 centipoise viscosity as opposed to the spraying or atomization of resins at a low viscosity utilized in the prior art. Adhesives or resins are introduced into ports 110 after being chilled or cooled in cooling means 120 to reduce the temperature of the resin from ambient temperature to around or below 40 degrees Fahrenheit as a means for increasing the viscosity of the resin.

The resin is blended with the fines and the resin coated fines are then discharged from outlet 92 for mixing or blending with the remaining components of the composition board in the second blender 36.

The method of the invention in contrast to the prior art facilitates the control of all the major conditions in the production of composition board including the size of the solid particles, the temperature of the adhesive and the intensity of the mixing of the components as well as the order in which liquid components are added. In the prior art waxes and resins are generally mixed together and added as an emulsion in blender 36. In the preferred application of the invention resin and fines are combined in high intensity blender 84 without waxes and then any waxes or other optional ingredients are added in blender 36.

Figure 3:
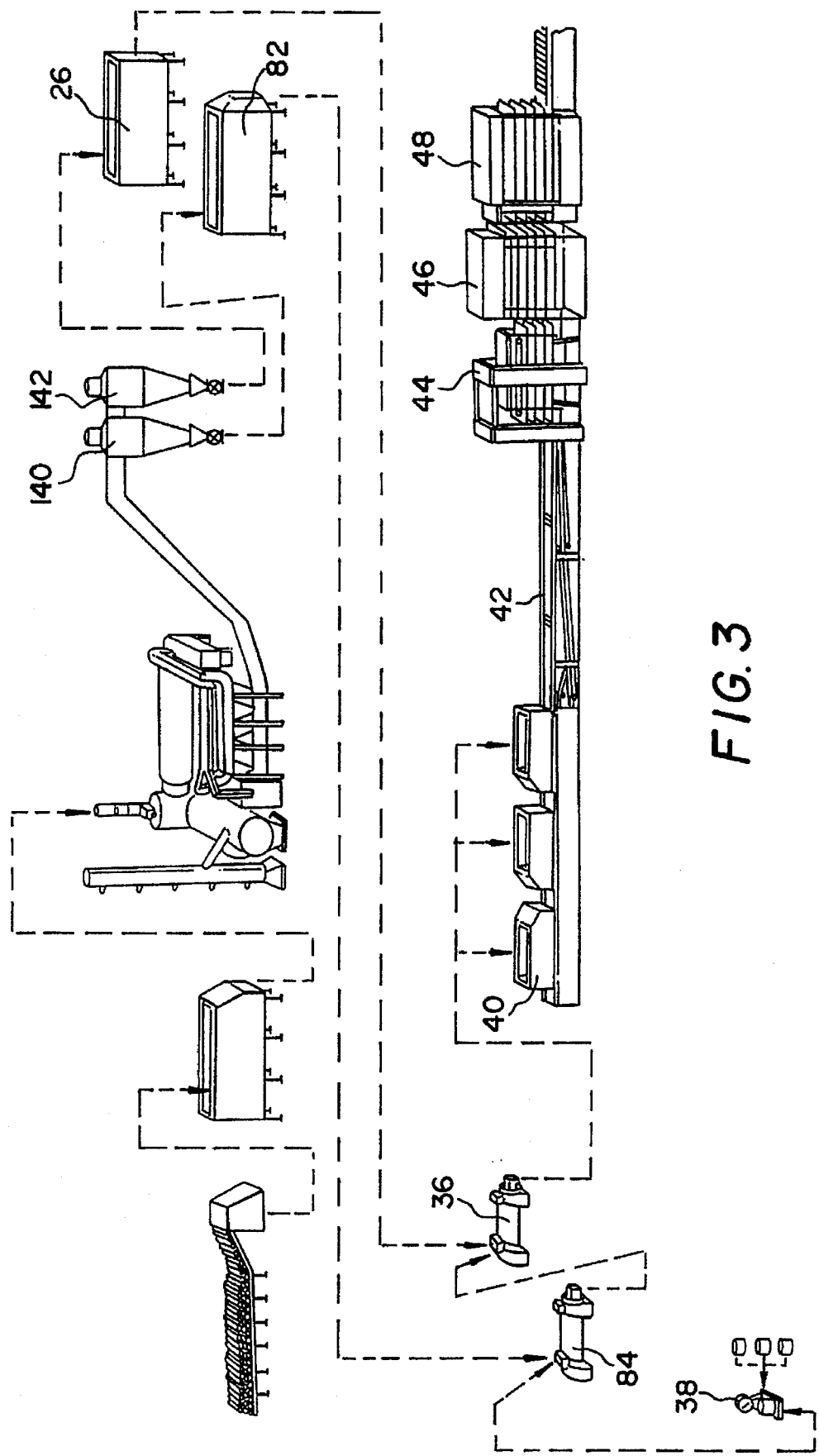
FIG. 3 is an alternative embodiment illustrating a process for producing a composition board in accordance with the present invention.

The advantages of the invention are further increased by the utilization of one or more air separators or air classifiers to separate the fines from the remaining solid particle components of composition board as illustrated in FIG. 3.

In FIG. 3 a pair of air separators 140 and 142 are utilized in place of a screen separator 18. The preferred air separator is a Kice air separator as is available from Kice Manufacturing Company of Kansas. Air separators 140 and 142 are more effectively capable of separating the various sizes of fines and fibrous components of the various types of composition board products. The size of the fines as utilized herein are dependent upon the desired composition of the composition board.

The present method provides a system for making a variety of forms of composition board by controlling the size of the fines from 1/8 of an inch to 10 mesh, 10 mesh to 20 mesh and 20 mesh to 40 mesh or below. For example when making flake board or boards with large particle size of wood pieces of 1/2 inch or greater and it is desirable to have the smallest particles would in this case be the particles of 1/8 of an inch to 10 mesh which particles would be separated and separately coated in high intensity blender 84. On the other hand where the finest components of the composition board can be less than 40 mesh it is preferable to separate the finest particles or the fines of 40 mesh or smaller and utilize these particles as the resin carrier by blending these particles in high intensity blender 84 before adding the resin coated fines product of high intensity blender 84 to the remaining larger components of the composition board for blending in blender 36.

Figure 5:
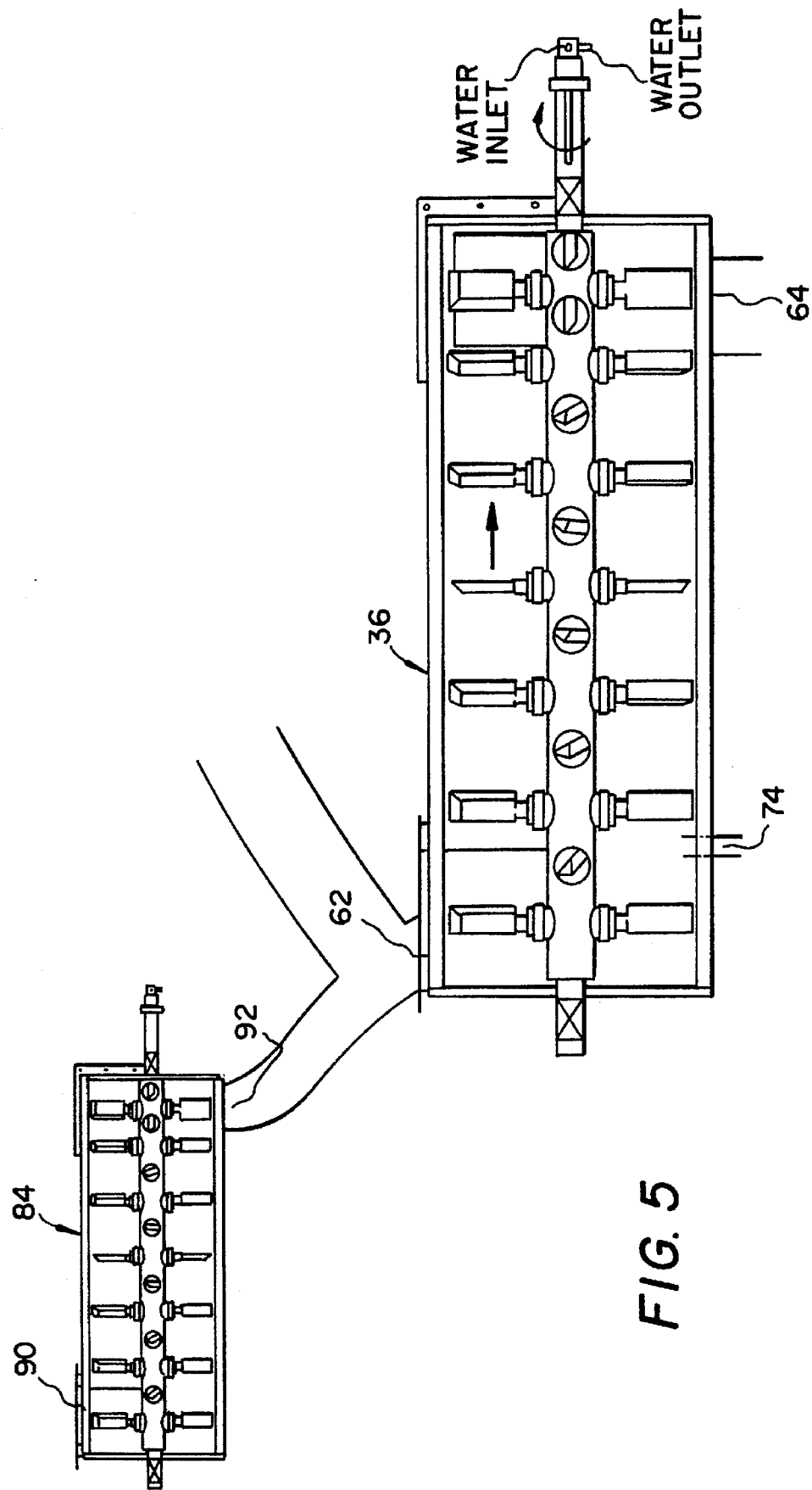
FIG. 5 is a cross sectional illustration of the series combination of blenders for the blending of components in accordance with the invention.

Air separators are particularly preferred where fines of 20 to 40 mesh and 40 to 100 mesh or smaller are utilized for separating the smallest particles by separator 140 which particles are then placed in bin 82. It has generally been found that the smaller the fines the more efficiently they serve as a resin carrier. The larger components are removed by separator 42 and placed in bin 26 to be subsequently added to blender 36 for blending with the precoated resin carrying fines from high intensity blender 84 as illustrated in FIGS. 3 and 5.

High intensity blender 84 is operated at about 1000 to 3500 RPM to mix fines placed in inlet 90 (FIG. 5) which resin. The resin carrying fines product is then introduced into inlet 62 of blender 36. The larger and remaining components of the composition board are also introduced to inlet 62 to be blended in blender 36. Blender 36 can be of a conventional design as shown in FIG. 5 or of a modified design to provide greater mixing efficiency. Resin is preferably not added to blender 36 but instead waxes and other optional fluid components can be added through port 74. The entire blended mass is discharged from outlet 64 and transported to forming stations 40 as has heretofore been described.

Figure 6:
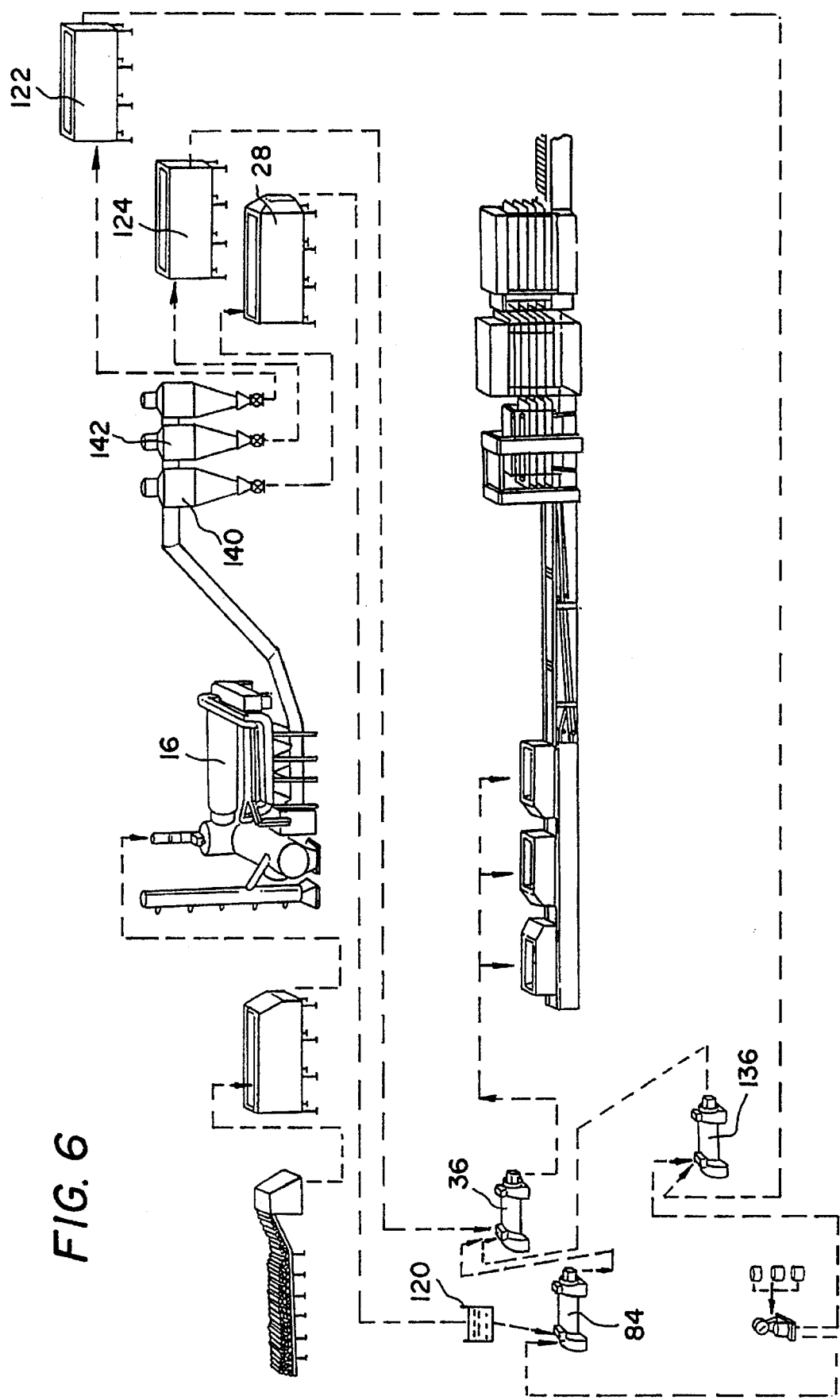
FIG. 6 is alternative embodiment illustrating the preferred mode of the process for producing composition board in accordance with the invention.

Referring now to FIG. 6 the best mode for practicing the invention is illustrated in which a high intensity blender 84 receives fines of a particle size of 20 to 40 mesh or smaller from bin 28 which have been removed by separator 140. The fines from bin 28 are toasted in a heating device 120 seal the outside surface of the fines before the introduction of the fines into high intensity blender 84. Heater 120 is designed to heat or toast the fines so that the fines partially cure the resin distributed on the surface of the fines in high intensity blender 84.

Alternatively and additionally the fines can be heated or toasted in high intensity blender 84 to prevent the resin from being absorbed into the fines. The purpose of the preheating of the fines by heater 120 is to limit the amount of resin that could penetrate into the interior of the fines and prevent unnecessary consumption of the resin or blender. About 4% of the binder is added to high intensity blender 84 based on the total weight of the composition board product. This typically represents, an addition of about 57% of the resin to the smallest of the fines in blender 84 which preferably operates at about 500 to 3,500 RPM.

A second group of fines having a particle size of 20 to 40 mesh are separated by separator 142 and placed in bin 124. A second high intensity blender 136 is provided for the purpose of coating the second group of fines of a particle size of about 20 to 40 mesh from bin 124. These intermediate sized particles similarly may be toasted or surface treated to prevent undue resin absorption into the particles. About 3% of the binder is added to the second high intensity blender 136 based on the total weight of the composition board product. This typically represents an addition of about 43% of the resin to the intermediate sized particles of the composition board product.

The largest particles are introduced to blender 36 from bin 122 along with the coated toasted particles from blender 84 and the coated particles from the second high intensity blender 136. No further resin or glue is added to blender 36 since both groups of resin coated fines from high intensity blender 84 and second high intensity blender 136 operate as a resin carrier for the remaining solid components of the composition board product in blender 36. Waxes and other optional components for treating the composition board product may be added to blender 36. Resin is metered into high intensity blender 84 as well as the second high intensity blender 136 to substantially coat the fines in blender 84 and the intermediate sized fines in the second high intensity blender 136 before their introduction into blender 36.

Figure 7:
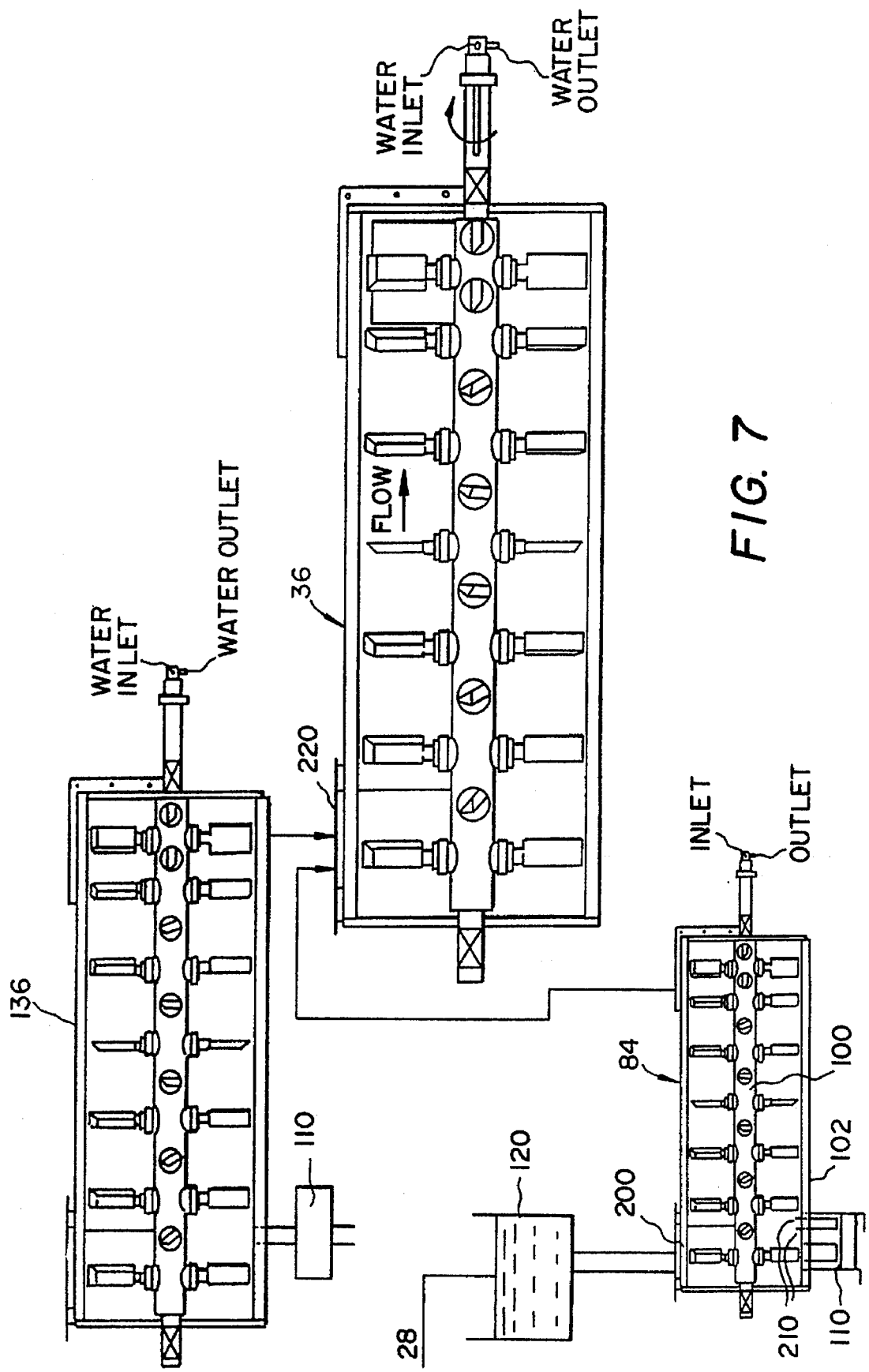
FIG. 7 is a cross sectional illustration of the combination of blenders arranged in series for blending the components in accordance with the preferred mode of the invention.

Referring now to FIG. 7 the blending of the two separate portions of fines in a first high intensity blender 84 and a second high intensity blender 136 before their mixing in blender 36 is illustrated in further detail. As heretofore discussed a first portion of fines representing the smallest sized fines from a fines bin 28 is preferably introduced into heater 120 toast the fines particles before their introduction into inlet 200 of high intensity blender 84. The fines are then coated with resin received from a resin mixing and feeding device 38 through ports 210 through the high intensity blender wall 102. Alternatively resin may be added through shaft 100 and through each of the individual tools 94 to assist in the coating of the fines in blender 84. High intensity blender 84 is operated at an RPM of about 1,500 to 3,500 and heated during blending. A low viscosity resin at about 600 to 900 centipoise is added to the smallest of the fines. A cooling device 110 cools the resin from ambient temperature to about 40 degrees Fahrenheit or less to assist in introducing the resin at its lowest viscosity into high intensity blender 84.

High intensity blender 136 concurrently is blending the intermediate sized fines of about 20 to 40 mesh with resin. High intensity blender 136 is designed to operate at between 1,000 to 2,000 RPM and may be similarly heated to prevent unwarranted absorption of the resin into the fines. The resin added to high intensity blender 136 is similarly added at a low viscosity of about 600 to 900 centipoises and similarly be equipped with a cooling device 110 to cool resin introduced into high intensity blender 136.

Resin coated fines from blender 84 are then introduced to inlet 220 of blender 36 along with precoated intermediate fines from blender 136 along with the remaining solid components of the composition board product. The entire product is then mixed in blender 36 with or without the addition of waxes before going to the forming station 40 to be formed into composition board products.

The process of the invention and novel composition board products resulting from the process of the invention are further illustrated in the Examples. In the following examples the experiments were performed in a production plant which produces molded particleboard parts in an automated production line controlled by a programmable logic computer. In all prior art Examples wood from a 4,000 pound per hour production line using a weigh belt was blended in a CB 8×40 blender made by Carolina Manufacturing Company, Research Triangle Park, N.C. All pieces made both according to prior art examples and the Examples illustrating the invention were then molded in a mold shaped for chair side panels which measured 18 inches by 30 inches by 0.625 inches thick.

EXAMPLE 1

(Prior art)

A particleboard was formed in accordance with the production process of the prior art Southern yellow pine obtained as green wood waste was first screened to remove all particles greater than ⅛ of an inch in size and remove all fines of less than 50 mesh (0.020 inch). As is conventional in the prior art all wood particles below 50 mesh were considered as waste fines and used to fuel the drier burner.

Southern yellow pine particles of ⅛ of an inch to 50 mesh were transported by the weigh belt the CB 8×40 blender (custom built batch blender) operating at a shaft speed of 1,000 RPM and 7% urea-formaldehyde resin solid (Borden Chemical 65% solids) was added to the entire mass of wood at 290 centipoises viscosity without the addition of wax. The estimated time of blend was about 40 seconds and the entire blended mass was placed in a production mold and cured into the prior art composition board product at 300 degrees Fahrenheit for 6 minutes at an initial pressure of 700 psi.

This prior art Example represents the prior art process of putting all the resin on all the wood in a single blender. Sample pieces were taken from the production mold for testing with the results reported in Tables I, II and III.

EXAMPLE 2

(Prior art)

A particleboard was formed in accordance with the production process of the prior art of Example 1 with all of the same conditions except for the addition of a resin dye which was gadded in the resin and the resin containing the dye was added to the CB 8×40 blender.

The resin dye was prepared by adding 354 grams of Rhodamine B of Sigma Chemical item R-6626 to 1,062.36 grams of isopopyl alcohol and diluted with 2,477.64 grams of water to form a 10% solution. The total dye solution was filtered and added to 3 gallons of resin (30 lbs.) The resin containing dye was placed in a pilot tank and connected to the CB 8×40 blender and the plant was operated in a normal manner and the output was collected only after all of the dye color was apparent in the final product.

The resulting particleboard product was then molded into a production board product as described in Example 1. This prior art Example similarly represents the prior art process of putting all the resin on all the wood. The major difference in this case is that dye was added to make the resin boundaries show up clearly in the final product. A sample piece of this production board product was then tested with the results of the test reported in Tables I, II and III.

EXAMPLE 3

A particleboard was prepared in accordance with the invention using Southern yellow pine from the production as in Example 1. However in this example a laboratory custom built blender of about 24 inches in diameter and 20 inches long. In this blender 28 pounds of Southern yellow pine was blended with 3.02 pounds of resin containing dye prepared in accordance with Example 1. The mixture was mixed for 30 minutes at ambient temperature using the laboratory custom blender operating at 30 RPM.

The remaining 20 pounds of Southern yellow pine which was uncoated was then added to the blended pre coated portion of the wood in the laboratory blender. The blender then continued to blend the product for an additional 30 minutes at 30 RPM. The resulting particleboard blended composition was then placed in the mold and cured into a board as described in Example 1.

This Example represents an example of where all the resin is put on only 75% of the wood to operate as a resin carrier for the remaining 25% of untreated wood which is then blended in a second blender. A sample piece of this board was then tested with the results of the test reported in Tables I, II and III.

EXAMPLE 4

A particleboard was prepared in accordance with the invention using Southern yellow pine from production in Example 1. In this Example the same equipment and conditions as were used as in Example 3 except in this case 14 pounds of Southern yellow pine was blended with 3.02 pounds of resin containing dye of Example 2 for 30 minutes. After 30 minutes of blending the remaining 14 pounds of untreated Southern yellow pine was added and blended for an additional 30 minutes at 30 RPM. The resulting particleboard blended composition was placed in a mold and cured into a board as described in Example 1.

This Example represents an example of where all the resin is coated or put on 50% of the wood which then is used as a resin carrier for the remaining 50% of the untreated wood which is then blended in a second blender. A sample piece of this board was tested with the results of the test reported in Tables I, II and III.

EXAMPLE 5

A particleboard was prepared in accordance with the invention using Southern yellow pine from production in Example 1. In this Example the same equipment and conditions as were used as in Example 3 except in this case 7.0 pounds of wood was blended with 6.04 pounds of resin containing dye of Example 2. After 30 minutes of blending at 30 RPM 6.52 pounds in the blender the remaining 24.5 pounds of untreated wood was added and blended for 30 minutes at 30 RPM. The resulting particleboard blended composition was placed in a mold and cured into board as described in Example 1.

This Example represents an example of where all the resin is placed on 25% of the wood which resin coated wood is then used as a resin carrier for the remaining 75% of untreated wood which is blended together in a second blender. A sample piece of this board was tested with the results of the test reported in Tables I, II and III.

EXAMPLE 6

A particleboard was prepared in accordance with the invention using Southern yellow pine from production in Example 1. In this Example the same conditions and equipment as were used in Example 3 were used in this Example except in this case 8.4 pounds of wood was blended with 9.06 pounds of resin containing the dye of Example 2. After 30 minutes of blending at 30 RPM 8.62 pounds of resin coated wood was removed and discarded. To the remaining 2.8 pounds of blended wood and resin in the blender the remaining 25.2 pounds of untreated wood was added and blended for 30 minutes at 30 RPM. The resulting particleboard blended composition was placed in a mold and cured into board as described in Example 1.

This Example represents an example of where all the resin is coated or put on 10% of the wood which is then used as a resin carrier for the remaining 90% of the untreated wood which is then blended in a second blender. A sample piece of this board was tested with the results of the test reported in Tables I, II and III.

EXAMPLE 7

A particleboard was prepared in accordance with the invention using Southern yellow pine from production Example 1. In this Example the same conditions and equipment as were used in Example 3 were used in this Example except in this case 5.6 pounds of wood were blended with 6.04 pounds of resin containing dye of Example 2. After 30 minutes of blending at 30 RPM no resin covered wood was discarded as a result of inadvertence. To the entire mass of resin coated wood 22.4 pounds of untreated wood was added and blended for 30 minutes at 30 RPM. The resulting particleboard blended composition was placed in a mold and cured into a board as described in Example 1.

This Example represents an example of a high resin content (15%) since an error was made in not removing a portion of the wood to make a 20% resin coated carrier. A sample piece of this board was tested and the results of the test are reported in Tables I, II and III.

EXAMPLE 8

A particleboard was prepared in accordance with the invention using Southern yellow pine from production Example 1. In this case however 5.6 pounds of fines from oak having a particle size of 20 to 50 mesh with the particles showing 0.34% of retained on 10 Tyler mesh, 5.58% retained on 16 Tyler mesh, 38.8% retained on 28 Tyler mesh, 41.62% retained on 30 Tyler mesh, 9.47% retained on 100 Tyler mesh, 3.55 retained on the bottoms pan. The uncoated fines constituted 20% by weight of the final product.

The fines were first blended in the CB 8×40 blender and 7% resin containing dye of Example 2 was added based on the entire weight of the finished particleboard product and blended for 40 seconds at 1,000 RPM at about 40 degrees Fahrenheit. The resin coated fines were placed in the laboratory batch blender of Example 3 and 22.4 pounds of Southern yellow pine was added and blended in the laboratory batch blender for 30 minutes at 30 RPM at ambient temperature. The resulting particleboard blended composition was placed in a mold and cured into a board as described in Example 1.

This Example represents an example where resin is used to coat the fines which are then used as a resin carrier for the untreated wood which is mixed together in a second blender. A sample piece of this board was tested with the results of the test reported in Tables I, II and III.

EXAMPLE 9

In this Example flakeboard was prepared using Southern yellow pine flakes having a particle size of about ½ inch by 2 inches by 0.020 inches thick in accordance with the invention. Fines were first mixed in the laboratory mixer by taking the fines of Example 8 and mixing them with the dyed resin of Example 2.

To approximately 8 pounds of the fines 0.56 pounds of resin was added and blended in the laboratory mixer at 30 RPM for 30 minutes. To this resin coated fines was added 12 pounds of Southern yellow pine flakes to the blender with 1.2 pounds of the fines and coated resin which was again mixed for 30 minutes at 30 RPM.

The resulting flakeboard composition was placed in a mold and cured into board as described in Example 1. The resulting product did not include wax and therefore it is believed the mass lacked the proper tack.

The foregoing Examples are only for the purposes of illustration and should not be construed in a limiting sense. These Examples demonstrate the use of fines and/or the separate blending and treatment of one portion of wood particles and the utilization of those pretreated wood particles provides advantages in preparing composition board products. The advantages of the invention are further illustrated in the use of fines as a resin carrier as indicated in the tests performed on the prior art products and novel products constructed in accordance with the invention.

The samples obtained from Examples 1–8 were tested for specific gravity and reported in Table I, internal bond testing and reported in Table II and for status bending and reported in Table III. All tests performed were in accordance with ASTM standard tests and procedures. The results of the specific gravity tests are described in the following Table I:

TABLE I

| Example # | Width (in) | Length (in) | Thck. (in) | Green wt. | Oven dry wt. (gm) | MC (%) (gm) | Specific gravity |
|---|---|---|---|---|---|---|---|
| 1 | 2.018 | 2.022 | 0.649 | 41.59 | 39.27 | 5.91 | 0.90 |
| 2 | 2.015 | 2.023 | 0.680 | 41.81 | 39.16 | 6.77 | 0.86 |
| 3 | 2.009 | 2.020 | 0.730 | 49.12 | 45.98 | 6.83 | 0.95 |
| 4 | 2.011 | 2.011 | 0.710 | 46.78 | 43.79 | 6.83 | 0.93 |
| 5 | 2.008 | 2.016 | 0.682 | 46.99 | 43.63 | 7.70 | 0.96 |
| 6 | 2.019 | 2.027 | 0.666 | 40.60 | 38.24 | 6.17 | 0.86 |
| 7 | 2.005 | 2.019 | 0.625 | 43.10 | 39.04 | 10.40 | 0.94 |
| 8 | 2.008 | 2.023 | 0.649 | 43.00 | 39.95 | 7.63 | 0.92 |

The samples from Examples 1–8 were further tested for the strength of internal bonding. The results of the internal bond testing are reported in the following Table II.

TABLE II

| Internal Bond Testing Machine (Tinius Olsen), speed 0.04 IN./MIN. - failure code C = Core F = Face | | | | | | | | |
|---|---|---|---|---|---|---|---|---|
| Example # | Width (In.) | Length (In.) | Thkness (In.) | Weight (g.) | Density (PCF) | M.L. (Lb.) | Failure Phase | IB (PS1) |
| 1-A | 2.002 | 2.023 | 0.643 | 37.70 | 55.035 | 995 | -F | 246 |
| 1-B | 2.006 | 2.030 | 0.649 | 40.35 | 58.041 | 1,113 | -C | 273 |
| 2-A | 2.004 | 2.027 | 0.665 | 40.09 | 56.420 | 757 | -C | 186 |
| 2-B | 2.005 | 2.023 | 0.669 | 40.32 | 56.487 | 720 | -C | 178 |
| 3-A | 2.006 | 2.027 | 0.720 | 47.53 | 61.719 | 1,163 | -F | 286 |
| 3-B | 2.005 | 2.017 | 0.717 | 47.45 | 62.210 | 1,170 | -C | 289 |
| 4-A | 2.005 | 2.030 | 0.669 | 40.32 | 56.292 | 720 | -C | 177 |
| 4-B | 1.998 | 2.025 | 0.702 | 46.03 | 61.610 | 745 | -C | 184 |
| 5-A | 2.010 | 2.017 | 0.671 | 45.94 | 64.200 | 900 | -C | 222 |
| 5-B | 2.012 | 2.027 | 0.671 | 44.35 | 61.611 | 700 | -F | 172 |
| 6-A | 2.030 | 2.025 | 0.680 | 42.53 | 57,840 | 210 | -C | 51.1 |
| 6-B | 2.027 | 2.022 | 0.675 | 42.27 | 58.084 | 175 | -C | 42.7 |

TABLE II-continued

Internal Bond Testing
Machine (Tinius Olsen), speed 0.04 IN./MIN. - failure code
C = Core F = Face

| Example # | Width (In.) | Length (In.) | Thkness (In.) | Weight (g.) | Density (PCF) | M.L. (Lb.) | Failure Phase | IB (PSI) |
|---|---|---|---|---|---|---|---|---|
| 7-A | 2.002 | 2.027 | 0.613 | 40.80 | 62.361 | 1,525 | -F | 376 |
| 7-B | 1.997 | 2.024 | 0.603 | 40.85 | 63.717 | 1,275 | -F | 315 |
| 8-A | 2.007 | 2.029 | 0.645 | 41.20 | 59.631 | 765 | -C | 188 |
| 8-B | 2.009 | 2.022 | 0.642 | 42.15 | 61.442 | 880 | -C | 217 |

The samples from Example 1–8 were further tested for static bending. The results of the static bending test are reported in the following Table III.

TABLE III

Static Bending
Machine (Tinius Olsen)     Speed 0.24 IN/MIN.
                                  Span 16 IN.
Board had blown before test
* SPan 12 IN.

MOR DATA

| Example # | WIDTH (in) | Thkness (in) | LOAD (lb) | Load PL (lb) | Defl. PL (in) | MOR (psi) | MOE (psi) |
|---|---|---|---|---|---|---|---|
| 1 | 2.015 | 0.649 | 110 | 73 | 0.240 | 3,111 | 565,461 |
| 2 | 2.022 | 0.692 | 96 | 65 | 0.235 | 2,380 | 422,713 |
| 3 | 2.019 | 0.728 | 139 | 94 | 0.215 | 3,118 | 574,723 |
| 4 | 2.012 | 0.715 | 114 | 64 | 0.185 | 2,660 | 481,684 |
| 5 | 2.019 | 0.679 | 121 | 73 | 0.205 | 3,120 | 576,930 |
| 6 | No Sample Available | | | | | | |
| 7 | 2.017 | 0.62 | 125 | 74 | 0.270 | 3,869 | 583,831 |
| 8 | 2.015 | 0.657 | 105 | 73 | 0.235 | 2,897 | 556,652 |

The samples of Examples 1, 2 and 8 were tested for water absorption and thickness swell using a standard DIN test. The results of the test are set forth in Table IV.

TABLE IV

| Sample | W.A. | T.S. |
|---|---|---|
| 1 | 33.4% | 20.1% |
| 2 | 48% | 26.6% |
| 8 | 24.3% | 13.2% |

The results of the thickness swell are significant since the sample of Example 8 was not coated with wax. Thickness swell in range of 15% is representative of prior art samples which include wax emulsion additives in 6×6 samples.

Figure 1C:
FIG. 1C is a magnified photograph magnified 10× illustrating an uncoated face surface of a prior art composition board formed in accordance with the prior art blending process of Example 2.
Figure 8:
FIG. 8 is a magnified photograph magnified 10× illustrating an uncoated face surface of a novel particleboard formed in accordance with Example 8 utilizing the process of the invention.

Referring now to FIG. 1C and FIG. 8 which represent a magnified photograph 10× of an untreated sample of Example 2 and an untreated sample in accordance with the invention in Example 8. As can be seen the untreated surfaces of the particle board produced in accordance with Example 8 demonstrate the virtual elimination of resin accumulation in interstices between the particles. A placement of a grid having 10 lines per inch over FIG. 1C shows that in a grid having 400 squares for a total examination viewing area that FIG. 1C has about 70 squares completely or more than half blocked with resin. The same grid however when applied to FIG. 8 over the same field reveals only 27 squares completely or partially covered with resin.

Figure 1D:
FIG. 1D is a magnified photograph magnified 10× illustrating a cross section of the prior art composition board of Example 2.
Figure 9:
FIG. 9 is a magnified photograph magnified 10× illustrating a cross section of the novel composition board of Example 8.

It is recognized that surfaces of particleboard are sanded and many times surface treated such that surface analysis can be misleading. However core readings are representative of the homogenity of the final product. As a result FIG. 1D was compared with FIG. 9 both of which represent a cross section of the same samples. The application of the same grid to the same field having the same magnification revealed that FIG. 1D had 120 squares completely or more than half filled with resin. FIG. 9 using the same grid revealed that 5 squares were completely or more than half filled with resin.

Figure 1E:
FIG. 1E is a magnified photograph magnified 30× and taken under ultraviolet light of the prior art composition board of Example 2.
Figure 10:
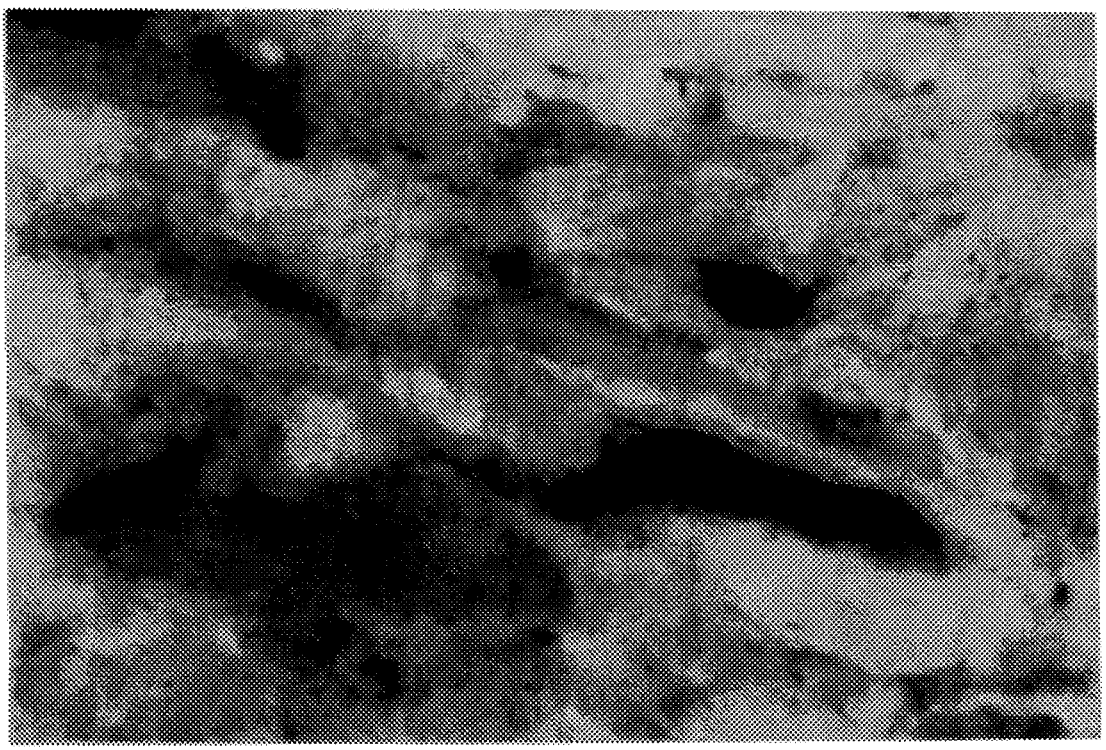
FIG. 10 is a magnified photograph magnified 30× and taken under ultraviolet light of the novel composition board of Example 8 constructed in accordance with the invention.

Referring now to FIG. 1E and FIG. 10 the same cross section was examined with the same grid. FIG. 1E and FIG. 10 were both taken under ultraviolet light at a magnification of 30. The results of the grid test revealed that FIG. 1E had 73 squares completely or partially filled with resin. FIG. 10 on the other hand had only 22 squares completely or partially filled with resin.

A comparison of the prior art figures with the figures illustrating composition board products of the invention show a more homogenous product with reduced intensities in volume and number between the particles. The results further demonstrate a percentage of about 2 to 7 of the surface area includes resin as compared to a percentage of about 18 to 30.

The products as well as the process of the invention provide superior advantages over the prior art which heretofore has removed the fines and used the fines as fuel. The present invention in contrast to the prior art separates the fines, coats them and utilizes them as a resin carrier or resin extender for the remaining components of the blended composition board product. The present invention is susceptible to a wide variety of modifications for the surface treatment of the various fines and intermediate sized particles such as the toasting or partially curing of the resin fines prior to their being mixed with the additional components of the composition board product.

The invention in providing for the control of the various steps and separate treatment of the components of the composition board product provides a great deal of flexibility in the formulation of composition board. The separate treatment of the components results in superior novel products while at the same time decreasing down time caused by the build up of resin and resin spotting and other manufacturing problems. The invention similarly removes the necessity for having two blenders in parallel in order to switch from one blender to another as heretofore accomplished in the prior art. The novel products resulting from the application of the invention are also new and useful and exhibit superior qualities over similar composition board products that have heretofore been available in the prior art.

The flexibility of the invention in the separate treatment of components and manipulation of conditions provide significant advantages. The manipulation of these conditions as well as modifications to various blending conditions will be made by those skilled in the art in applying the invention to large scale production operations. These other changes, substitutions and modifications of the invention are intended to be within the scope of the following claims.

What is claimed is:

1. A method for the production of composition board comprising the steps of:
   (a) separating the solid wood particle constituents of a blended composition board product into a first part of solid wood particle constituents which are mixed in two separate mixing steps from a second part of solid wood particle constituents having a particle size of about ½ inch by 2 inches by ⅛ Of an inch or less but having a particle size larger than the particle size of said first part of solid wood particle constituents which are left in a substantially urea formaldehyde resin uncoated state and are mixed in a single mixing step, said first part of said solid wood particle constituents having a particle size larger than about 120 mesh and which represents from about 10% to 75% by weight of said wood particle constituents of said blended composition board product;
   (b) separately mixing only said first part of solid wood particle constituents with from about 75 to 100 percent by weight of a urea formaldehyde resin used for said blended composition board product to form a urea formaldehyde resin carrier and binder having a solid wood nucleus for binding said second part of solid wood particle constituents; and
   (c) mixing said second part of solid wood particle constituents in said substantially urea formaldehyde resin uncoated state with said urea formaldehyde resin carrier and binder having a solid wood nucleus for binding said second part of solid wood constituents to form said blended composition board product.

2. The method of claim 1 further comprising the step of controlling the viscosity of said adhesive at from between 200 to 900 centipoises during said step of separately mixing said first part of solid wood particle constituents.

3. The method of claim 2 wherein said first part of solid wood particle constituents represents from about 10 percent to about 34 percent of said solid wood particle constituents of said blended composition board.

4. The method of claim 1 wherein said step of separately mixing is achieved in a separate mixing blender.

5. The method of claim 4 wherein said separate mixing blender is a high intensity blender operating at from about 1,500 to 3,500 rpm.

6. The method of claim 5 further comprising the step of controlling the viscosity of said adhesive at from about 200 to 900 centipoises.

7. The method of claim 6 wherein said step of controlling said viscosity of said adhesive is achieved by cooling said adhesive.

8. The method of claim 7 wherein said viscosity of said adhesive is from between about 400 to 900 centipoises.

9. The method of claim 4 further comprising the step of heating said first part of solid wood particle constituents prior to said step of separately mixing.

10. The method of claim 9 wherein said step of heating is accomplished immediately after separately mixing said first part of solid wood particle constituents with from about 75 to 100 percent of said adhesive.

11. The method of claim 9 wherein said step of heating is accomplished by heating said first part of solid wood particle constituents in a heating zone in said separate mixing blender.

12. The method of claim 9 further comprising the step of cooling said adhesive before said step of separately mixing said first part of solid wood particle constituents.

13. The method of claim 12 wherein said separate mixing blender is a high intensity blender operating at from about 1,500 rpm to 3,500 rpm.

14. The method of claim 4 wherein said step of separating said first part of solid wood particle constituents from said second part of solid wood particle constituents includes utilizing solid wood particles of about 10 mesh to about 120 mesh as said first part of said solid wood constituents.

15. The method of claim 14 wherein said first part of solid wood particle constituents have a particle size of about 10 to 60 mesh.

16. The method of claim 14 wherein said first part of solid wood particle constituents have a particle size of about 20 mesh to 40 mesh.

17. The method of claim 14 wherein said first part of solid wood particle constituents have a particle size of about 40 mesh to 100 mesh.

18. The method of claim 14 wherein said first part of solid wood particle constituents have a particle size of about 60 mesh to 100 mesh.

19. The method of claim 1 wherein said step of separating provides for the separation of the solid wood particle constituents into a third part of solid wood particle constituents.

20. The method of claim 19 wherein said step of separating said first part of solid wood particle constituents from said second part of solid wood particle constituents and said third part of solid wood particle constituents is based on particle size.

21. The method of claim 19 wherein said first part of solid wood particle constituents have a particle size of about 40 mesh to 120 mesh and said third part of solid wood particle constituents have a particle size of about 20 mesh to about 40 mesh and said second part of solid wood particle constituents have a particle size of about 10 mesh to ⅛ of an inch.

22. The method of claim 21 further comprising the step of mixing said third part of solid wood particle constituents with said adhesive.

23. The method of claim 21 wherein said step of separately mixing said first part of solid wood particle constituents is achieved in a mixing blender and said step of mixing said first part of solid wood particle constituents with said second part of solid wood particle constituents is achieved in a second mixing blender.

24. The method of claim 22 wherein said step of mixing includes mixing said adhesive carrier and binder with said second part of solid wood particle constituents and said third part of solid wood particle constituents is achieved in said second mixing blender.

25. A process for the production of a blended composition board comprising;
(a) separating solid wood particle constituents of a desired blended composition board product into a first part of solid wood particle constituents representing the smaller size wood particles which are blended in two blending steps from a second part of solid wood particle constituents representing the larger size solid wood particles which are blended in a single blending step said larger size wood particles having a particle size of about ½ inch by 2 inches by ⅛ of an inch or less but having a particle size larger than the particle size of said smaller size solid wood particles and said smaller size wood particles having a particle size larger than about 120 mesh;
(b) separately blending only said first part of solid wood particle constituents with from about 75 to 100 percent by weight of a urea formaldehyde resin used for the production of the blended composition board to form a urea formaldehyde resin carrier and binder having a solid wood nucleus for binding said second part of solid wood particle constituents;
(c) leaving said second part of solid wood particle constituents in a substantially urea formaldehyde resin uncoated state; and
(d) blending said urea formaldehyde resin carrier and binder having a solid wood nucleus with said second part of solid wood particle constituents in said substantially urea formaldehyde resin uncoated state.

26. The process of claim 25 wherein said step of separately blending is achieved in a high intensity blender operating at from about 1,500 to 3,500 rpm and said first part of solid wood particle constituents represents from about 10 percent to about 75 percent of the solid content of said blended composition board.

27. The process of claim 26 further comprising the step of controlling the viscosity of said adhesive at from about 400 to 900 centipoises.

28. The process of claim 27 wherein said step of controlling the viscosity of said adhesive is achieved by cooling said adhesive to about 40 degrees Fahrenheit.

29. The process of claim 27 further comprising the step of heating said first part of solid wood particle constituents prior to said step of separately blending.

30. The process of claim 29 wherein said step of heating is accomplished by heating said first part of solid wood particle constituents in a heating zone of a high intensity blender.

31. The process of claim 29 wherein said step of blending is achieved in a second blender.

32. The process of claim 25 wherein said first part of solid wood particle constituents have a particle size of about 10 mesh to 40 mesh.

33. The product of the process of claim 32.

34. The process of claim 25 wherein said first part of solid wood particle constituents have a particle size of about 20 mesh to 100 mesh.

35. The product of the process of claim 34.

36. The process of claim 25 wherein said first part of solid wood particle constituents have a particle size of 40 mesh to 100 mesh.

37. The product of the process of claim 36.

38. The process of claim 25 wherein said step of separating provides for the separation of a third part of solid wood particle constituents representing intermediate size wood particles.

39. The process of claim 38 wherein said first part of solid wood particle constituents have a particle size of about 40 mesh to 100 mesh and said third part of solid wood particle constituents have a particle size of about 20 mesh to 40 mesh and said second part of solid wood particle constituents have a particle size of about 10 mesh to about ½ inch by 2 inches by ⅛ of an inch.

40. The process of claim 38 further comprising the step of coating said third part of solid wood particle constituents with an adhesive in a separate blender before said step of blending said first part of solid wood particle constituents with said second part of solid wood particle constituents.

41. A method for making composition board comprising the steps of:
(a) separating the solid wood particle ingredients of the composition board product into small sized solid wood particle components which are blended in two blending steps from the large sized solid wood particle components which are blended in a single blending step, wherein said small sized solid wood particle components represent from about 5 percent to about 75 percent by weight of said solid ingredients of said composition board product and said large sized solid wood particle components have a particle size of about ½ inch by 2 inches by ⅛ of an inch or less but have a particle size larger than said small sized solid wood particle components and said small sized solid wood particle components have a particle size larger than about 120 mesh;
(b) separately blending only said small sized solid wood particle components in a first blender with a urea formaldehyde resin;
(c) controlling the viscosity of said urea formaldehyde resin added to said first blender;
(d) adding 75 percent to 100 percent of the total urea formaldehyde resin requirements of said composition board product to said first blender to provide a substantially urea formaldehyde resin coated small sized solid wood particle urea formaldehyde resin carrier and binder; and
(e) blending said substantially urea formaldehyde resin coated small sized solid wood particle urea formaldehyde resin carrier and binder with said large sized solid wood particle components in a second blender to provide a blended composition board having said large sized components substantially uncoated and bound together with said substantially solid wood particle urea formaldehyde resin carrier and binder.

42. The method of claim 41 wherein said step of adding 75 percent to 100 percent of said adhesive requirements to said first blender represents the addition of substantially all of said adhesive to about 5 to 50 per cent of the total solid ingredients of said composition board product.

43. The method of claim 41 wherein said step of adding 75 percent to 100 percent of said adhesive requirements to said first blender represents the addition of all of said adhesive to about 5 to 30 per cent of the total solid ingredients of said composition board product.

44. The method of claim 41 wherein said viscosity of said adhesive is controlled at a consistency of about 600 to 900 centipoises.

45. The method of claim 44 wherein said viscosity of said adhesive is controlled by cooling.

46. The method of claim 41 further comprising the step of heating said small sized solid wood particle components before said step of separately blending said small sized solid wood particle components to said first blender.

47. The method of claim 41 further comprising the step of heating said small sized solid wood particle components in a heating zone in said first blender.

48. The method of claim 47 wherein said first blender is a high intensity blender operating at from about 1,000 to 3,500 rpm.

49. The method of claim 41 wherein said step of separating said solid wood particle ingredients is accomplished with an air separator.

50. The method of claim 41 wherein said small sized solid wood particle components have a particle size of about 40 mesh to 100 mesh.

51. The method of claim 50 further comprising the step of adding wax to said adhesive.

52. The method of claim 50 further comprising the step of adding wax to said second blender.

53. A particleboard product comprising an aggregate of large solid wood particles substantially uncoated with a urea formaldehyde resin having a particle size of about ½ inch by 2 inches by ⅛ of an inch or less but having a particle size larger than the particle size of a selected smaller solid wood particle component wherein said substantially uncoated large solid wood particles are bound together by an aggregate of a substantially urea formaldehyde resin coated smaller solid wood particles wherein said substantially coated smaller solid wood particles are selected from a group of smaller solid wood particles consisting of:

(a) solid wood particles having a particle size of about 20 mesh to 40 mesh;

(b) solid wood particles having a particle size of about 40 to 100 mesh;

(c) solid wood particles having a particle size of about 120 mesh; and wherein said substantially uncoated large solid wood particles are in a range of about 60 to 80 percent by weight of the particleboard product.

54. A particleboard product comprising:

(a) a component of larger solid wood particles having a particle size of about ½ inch by 2 inches by ⅛ of an inch or less but having a particle size larger than the particle size of a component of smaller solid wood particles, said larger solid wood particles being substantially uncoated with a urea formaldehyde resin;

(b) a component of smaller solid wood particles substantially coated with a urea formaldehyde resin having a particle size of 120 mesh or greater but less than the particle size of said larger solid wood particles; and (c) a urea formaldehyde resin boundary connecting said larger solid wood particles with said smaller solid wood particles said urea formaldehyde resin boundary forming from about 2 percent to 15 percent of the surface area as measured along any unfinished viewing plane of said particleboard product at 10× magnification.

55. A method for the production of flakeboard comprising the steps of:

(a) preparing a flakeboard urea formaldehyde resin carrier having a solid wood nucleus by mixing solid wood fines having a particle size of greater than 120 mesh but less than the particle size of the particles of flakeboard with about 75 to 100 percent of the urea formaldehyde resin used to manufacture the final flakeboard product;

(b) adding said flakeboard urea formaldehyde resin carrier to particles of flakeboard having a particle size of about ½ inch by 2 inches by about 0.020 inches thick or less but having a particle size larger than said solid wood fines substantially uncoated with a urea formaldehyde resin; and (c) mixing said flakeboard urea formaldehyde resin carrier with said particles of flakeboard substantially uncoated with said urea formaldehyde resin.

56. The method of claim 55 further comprising the step of adding wax to provide additional tack to the flakeboard product.

57. The method of claim 56 wherein said wax is added to said adhesive.

58. The method of claim 56 wherein said step of adding wax is accomplished by adding said wax to said particles of flakeboard before said step of adding said flakeboard adhesive carrier to said particles of flakeboard.

59. The method of claim 56 wherein said step of adding wax is accomplished by adding said wax during the step of mixing.

60. The method of claim 1 further comprising the step of adding from about 1 to 25 percent of the adhesive used for said blended composition board product during the step of mixing.

61. The method of claim 1 further comprising the step of adding from about 1 to 25 percent of the adhesive to said second part of solid wood particle constituents.

62. A method for the production of composition board comprising:

(a) separating solid wood constituents of a blended composition board product into a first part of solid wood constituents and a second part of solid wood constituents said first part of said solid wood constituents having a particle size greater than 120 mesh but less than the particle size of said second part of solid wood constituents and said second part of said solid wood constituents having a particle size of about ½ inch by 2 inches by ⅛ of an inch or less but larger than the particle size of said first part of said solid wood constituents, said first part of solid wood constituents representing from about 10% to 75% of said solid wood constituents of said blended composition board product;

(b) coating said first part of solid wood constituents with a urea formaldehyde resin to form a urea formaldehyde resin carrier and nucleus for binding said second part of solid wood constituents, said urea formaldehyde resin carrier and nucleus for binding utilizing from about 75% to 100% of the total urea formaldehyde resin requirements of said blended composition board product; and (c) mixing said urea formaldehyde resin carrier and nucleus with said second part of solid constituents to form said blended composition board product.

63. The process of claim 62 wherein said first part of solid wood constituents constitutes from about 10% to 34% of said solid wood constituents of said blended composition board product.

64. A method for the production of composition board comprising the steps of:

(a) coating a first part of solid wood constituents of a blended composition board product having a particle size of greater than 120 mesh but less than the particle size of a second part of solid wood constituents of said composition board product wherein said first part of solid wood constituents are coated with from about 75% to 100% of the total urea formaldehyde resin requirements used to form a urea formaldehyde resin carrier having a solid wood nucleus; and (b) mixing said urea formaldehyde resin carrier having a solid wood nucleus with a second part of solid wood constituents said second Dart of solid wood constituents having a particle size of about ½ inch by 2 inches by ⅛ of an inch or less but larger than the particle size of said first part of solid wood constituents.

* * * * *